Figure 1:
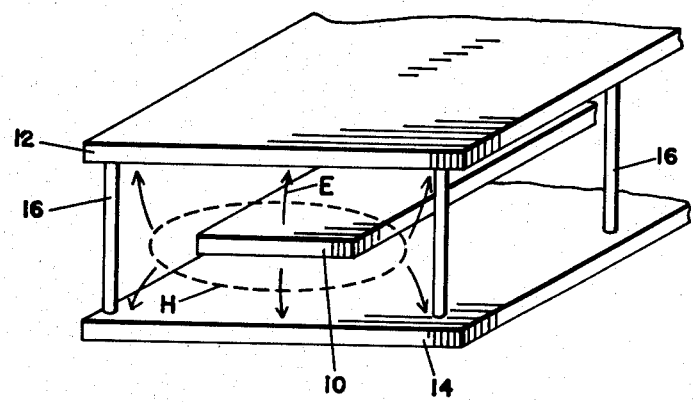

June 25, 1963

D. R. AYER ETAL 3,095,544

VARIABLE TRANSMISSION LINE COUPLER

Filed May 10, 1960

4 Sheets-Sheet 1

Donald R. Ayer
Jesse L. Butler
Robert L. Williston
INVENTORS

David A. Rich

ATTORNEY

Donald R. Ayer
Jesse L. Butler
Robert L. Williston
INVENTORS

David A. Rich
ATTORNEY

June 25, 1963   D. R. AYER ETAL   3,095,544
VARIABLE TRANSMISSION LINE COUPLER
Filed May 10, 1960   4 Sheets-Sheet 4

Donald R. Ayer
Jesse L. Butler
Robert L. Williston
INVENTORS

David A. Rich
ATTORNEY 3,095,544
VARIABLE TRANSMISSION LINE COUPLER
Donald R. Ayer and Jesse L. Butler, Nashua, and Robert L. Williston, Milford, N.H., assignors to Sanders Associates, Inc., Nashua, N.H., a corporation of Delaware
Filed May 10, 1960, Ser. No. 35,102
19 Claims. (Cl. 333—10)

This invention relates to the art of high frequency transmission lines. More specifically, it relates to a variable transmission line coupler adapted to transfer predetermined amounts of power from one transmission line to another.

The coupler, whose conductive elements form flat-strip transmission lines, has good directional properties and substantially invariant characteristic impedances over a wide range of coupling ratios. It is provided with a novel adjusting mechanism which is economical to construct and simple in operation while permitting accurate presetting of coupling ratios.

Transmission line couplers fall into the general class of devices used to divert to a branch line a portion of the energy propagated along a main or primary transmission line. One such device is a power divider in which the main line divides into several branches. In accordance with the well-known electrical principles, the power carried by the main line is distributed among the branches in inverse proportion to their characteristic impedances.

In a directional coupler, a load connected to a secondary line receives energy only from waves travelling in a particular direction on the primary line; ideally it receives no part of energy travelling in the opposite direction. One type of directional coupler, which is in reality a combination of power dividers, uses a pair of intermediate branch lines connected between the main line and the secondary line. The length and spacing of the intermediate lines is such as to provide cancellation of waves travelling in one direction on the secondary line with augmentation of energy travelling in the other direction, for a given direction of propagation on the main line.

Some directional couplers do not require any direct physical connection between the main and secondary or branch lines. Of particular interest is the electromagnetic or parallel line coupler in which a portion of the secondary line is disposed in close proximity and parallel to the main line. The changing currents in the main line, resulting from the propagation of electromagnetic waves along it, induce axial electric fields in the branch line, giving rise to currents in the reverse direction in the branch line. At the same time, the radial electric field corresponding to the charge distribution on the main line tends to cause a similar distribution on the branch line. The electric field corresponding to the charge distribution on the branch line and the magnetic field corresponding to the current in the latter line are the constituent parts of an electromagnetic wave travelling along this line. In the coupling region, currents on the main and branch lines are opposite in phase. The voltages have the same phase, and, therefore, the energy on the secondary line is propagated in the opposite direction to that on the main line.

It is often desirable to vary the portion of main line power delivered to a branch line. An example of such a situation is laboratory experimentation where a power transfer device may be used in a variety of circuit arrangements. Furthermore, it is often difficult to predict, when constructing a fixed directional coupler, just what the exact coupling ratio will turn out to be. Where tolerance requirements are restrictive, it is desirable to construct a variable device which can then be set to the exact transfer ratio.

Changing the power ratios in power dividers presents difficult practical problems. It involves changing the characteristic impedances of the various branches and rematching them to the main line as well as to the various loads connected to them. Thus, a large number of variables have to be controlled, and even if control of the individual variables is possible, simultaneous control of all of them in a predetermined manner requires unduly cumbersome and complex apparatus.

Variable directional couplers have posed a similar problem. The proportion of main line energy transferred to the branch line of an electromagnetic coupler may be varied by changing the spacing between the main and branch lines. However, the presence of the branch line within the electric field of the main line affects the capacitance of the latter line in the coupling region, and the capacitance, in turn, partly determines the characteristic impedance of the main line in this region. Similarly, the presence of the main line affects the characteristic impedance of the branch line in the coupling region. These capacitance effects vary with the spacing between the lines, and thus, if the spacing between the lines is changed to adjust the amount of coupling, the characteristic impedances of both lines will undergo significant variations. This will cause impedance mismatches at all terminals of the coupler and thereby diminish both the power which may be fed into and withdrawn from the coupler. It also will affect the directivity of the coupler, since energy will be reflected from the output end of the branch line toward the other end thereof. Moreover, energy reflected from the output end of the main line and coupled to the branch line is propagated in the wrong direction on the latter line.

Accordingly, it is a principal object of the present invention to provide an improved high frequency power distribution device adapted to divide its input power among a plurality of outputs in varying arbitrary proportions or output ratios.

Another object of our invention to to provide a distribution device of the above type whose characteristic impedance remains substantially constant over a wide range of output ratios.

Yet another object of our invention is to provide a device of the above type in which the various outputs are isolated from each other so that reflected energy will not be transferred from one output to another.

A further object of our invention is to provide a distribution device which exhibits the above properties over a substantial frequency range.

A still further object of the invention is to provide a device of the above type capable of varying, from substantially zero to all of the input power, the amount of power delivered to each of two loads.

Yet another object of the present invention is to provide a device of the above type in which the various outputs are isolated from each other so that reflected energy will not be transferred from one output to another.

A further object of our invention is to provide a distribution device which exhibits the above properties over a substantial frequency range.

A still further object of the invention is to provide a device of the above type capable of varying, from substantially zero to all of the input power, the amount of power delivered to each of two loads.

Yet another object of the present invention is to provide a variable power distribution device incorporating a simple mechanical adjusting mechanism which may be accurately preset to provide desired output ratios.

A further object of the invention is to provide a distribution device of the above character which is compact and simple to install and operate.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 2:
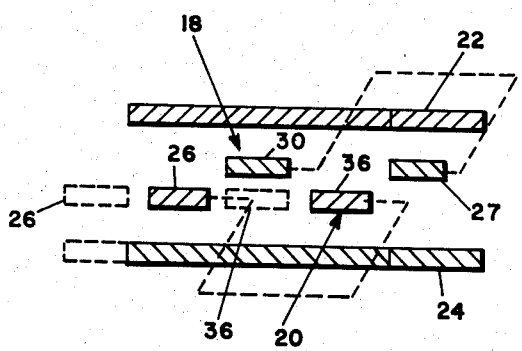
Figure 3:
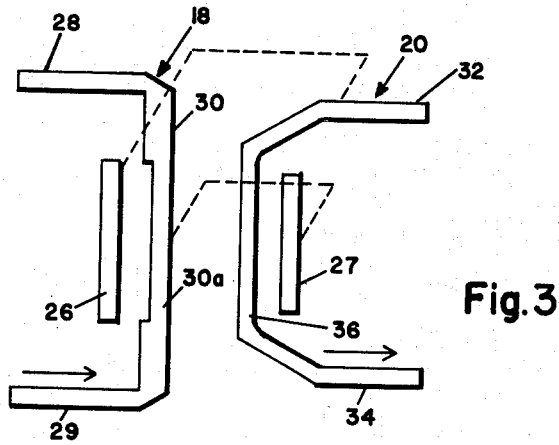
Figure 4:
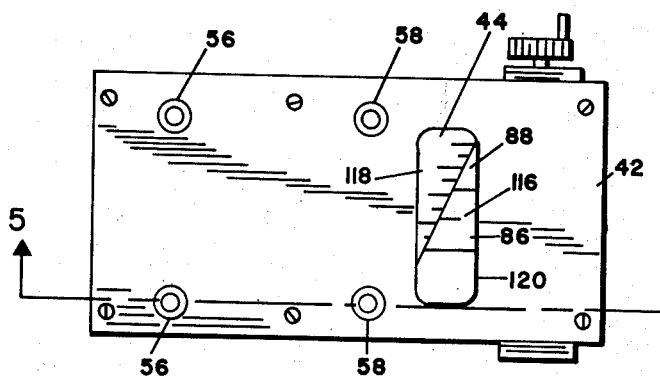
Figure 5:
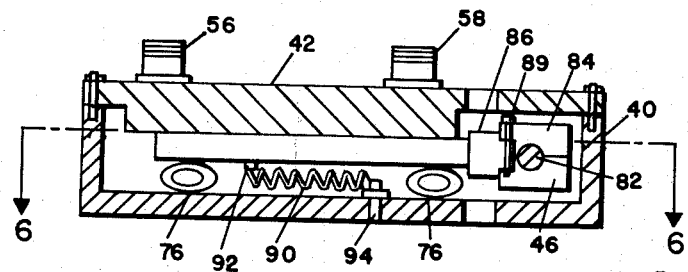
Figure 6:
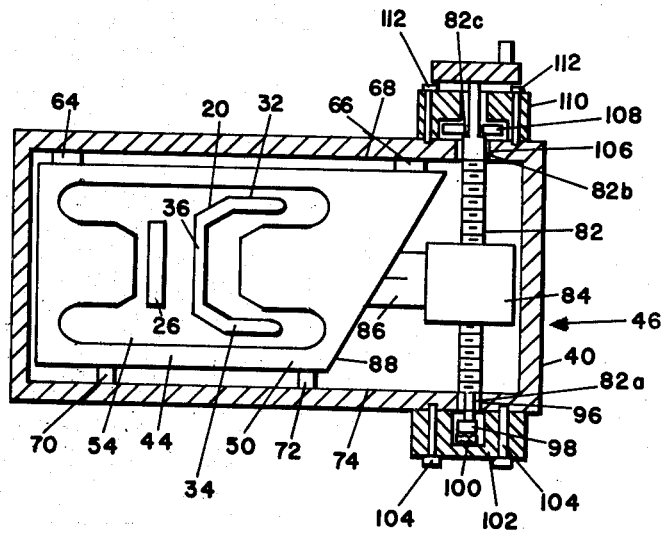
Figure 7:
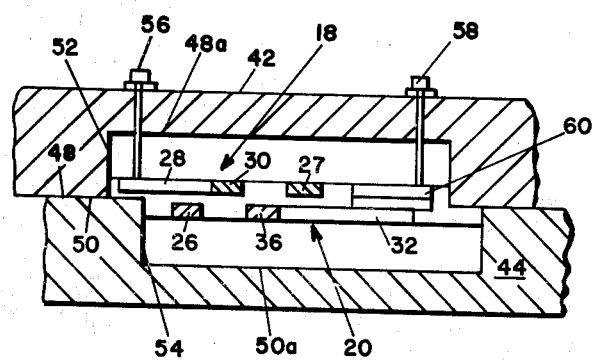
Figure 8:
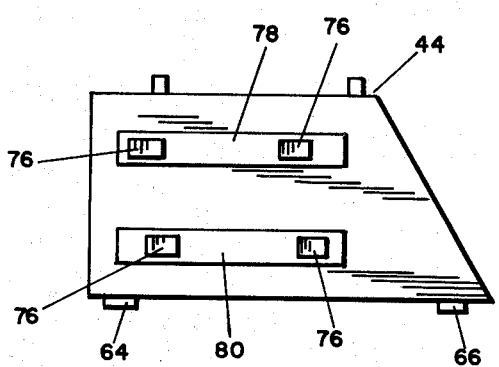
Figure 9:
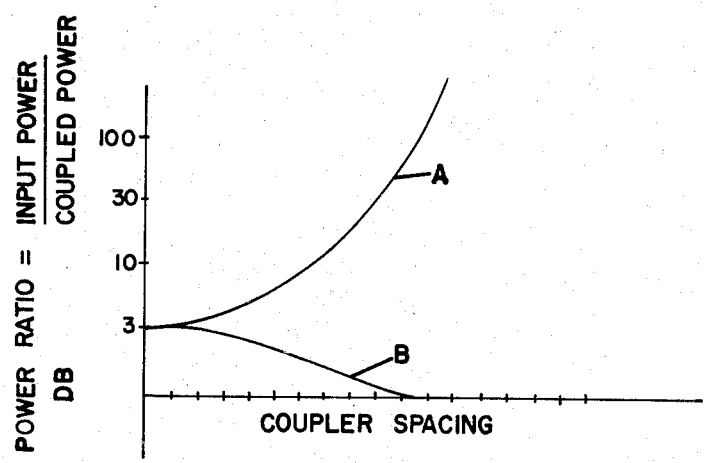

For a fuller understanding of the nature and objects of the invention, reference should be had to the following detailed description, taken in connection with the accompanying drawings, in which:

FIG. 1 is a transverse section of a strip transmission line, showing the configurations of the electric and magnetic fields between the conductors, FIG. 2 is a simplified transverse section of the conductors of a variable coupler embodying the principles of our invention, FIG. 3 is a plan view of the inner conductors of the coupler of FIG. 2, FIG. 4 is a plan view of a variable coupler incorporating the conductor configuration of FIG. 3, FIG. 5 is a view, partly in section, of the variable coupler of FIG. 4, taken generally along line 5—5 therein, FIG. 6 is a view, taken along line 6—6 of FIG. 5, showing in detail the adjusting mechanism used in the variable coupler, as well as the conductor configuration of the movable plate thereof, FIG. 7 is a fragmentary section of the fixed and movable plates, showing the relative disposition of the various conductors therein, FIG. 8 is a bottom view of the movable plate of the coupler, and FIG. 9 is a graph showing the variations in transmitted and coupled power in a variable coupler incorporating the principles of our invention.

In general, our invention comprises an improved parallel line directional coupler in which the coupling between the main and branch lines is varied by adjusting the spacing between a pair of conductors in the two lines. A compensating conductor, close to the main line conductor in the adjustable pair, moves toward and away from it in coordination with changes in the spacing between it and the corresponding branch line conductor. When the spacing between the main and branch line conductors increases, the compensating conductor moves toward the main line conductor, and when the spacing decreases, it moves away. Thus, whenever the total capacitance of the main line conductor tends to increase or decrease because of a change in the distance to the branch line, the synchronized movement of the compensating conductor effects an opposite change in the capacitance. Accordingly, the capacitance of the main line and the characteristic impedance thereof are substantially invariant as the degree of coupling between the main and branch lines is changed.

In a similar manner, we have provided a second compensating conductor whose position relative to the branch lines changes as the degree of coupling is varied. It compensates for changes in the capacitance of the branch line caused by variations in the spacing of the main line therefrom and thereby maintains the characteristic impedance of the branch line in the coupling region substantially constant.

The transmission lines used in our directional coupler are preferably of the flat-strip type in which a thin, flat inner conductor is disposed midway between a pair of flat outer conductors termed ground planes. An important advantage of flat-strip line in this application is the ability to effect planar displacement of the central conductor without changing the characteristics of the line. That is, the central conductor may be moved about in a plane parallel to the ground plane conductors without affecting the mode of propagation or the characteristic impedance. Furthermore, inner conductors of different transmission lines may share the same outer conductors, much as low frequency lines often share a common conductor such as a ground return.

More specifically, the two lines of a variable directional coupler may include the same ground planes. The degree of coupling between the lines is then determined by the spacing between their inner conductors. When the spacing between the inner conductors is varied, the only resulting effects are the above-noted changes in capacitance due to the proximity of the conductors to each other, and these effects are cancelled by the compensating conductors, which are also disposed between the ground planes. Another advantage accruing from the use of the flat-strip configuration is the compactness of the coupler.

The portion of the input power coupled to the branch line varies from zero up to one half, as the spacing between the inner conductors of branch and main lines is varied from its maxium to minimum values. The power not delivered to the branch line is transmitted through to the main line output terminal. Thus, at minimum spacing of the lines, one half the input power is coupled and the other half is transmitted. At maximum spacing, substantially all the input power is transmitted through the main line. Accordingly, the relative power delivered to loads connected to branch and main line outputs may be set at any desired ratio by adjusting the spacing between the lines and suitably transposing the outputs connected to the respective loads.

The above circuit parameters are physically embodied in a unit which is compact and is provided with readily accessible input and output terminals. The unit also has an adjusting mechanism which permits precise setting of the coupling ratio to predetermined values. The adjusting mechanism uses a lead screw to traverse an inclined nut assembly which acts as a cam against a plate carrying the movable circuit elements of the coupler. The position of the nut with respect to the cooperating cam surface on the movable plate uniquely determines the spacing of the main and branch lines, and therefore the effect of backlash in the lead screw is completely eliminated.

In FIG. 1 we have illustrated the field distribution in a typical flat-strip transmission line. The line has an inner conductor 10 situated between and parallel to a pair of outer conductors or ground planes 12 and 14. The conductors 10, 12 and 14 are flat and may be quite thin. For example, they may be formed of foil made to adhere to dielectric material (not shown) filling the space between them. At an instant of time when the conductor 10 is positive with respect to the ground planes 12 and 14 and the current in the conductor 10 is in the direction of the arrow, the field distribution in the transmission line is as shown in FIG. 1, with the solid arrows representing the electric field E and the dash lines representing the magnetic field H.

The field configuration of FIG. 1 is indicative of the TEM propagation mode, more fully described in U.S. Patent No. 2,812,501 which issued November 5, 1957 to D. J. Sommers for "Transmission Line." However, it is possible to transmit other modes on the line under certain conditions. For example, if the inner conductor 10 is offset from its nominal position midway between the ground planes 12 and 14, the ground planes will be at somewhat different potentials. This difference in voltage will support a parallel plate mode. Accordingly the ground planes are "shorted" together by a plurality of pins 16 spaced along both edges of the inner conductor. The pins impose an equipotential condition on the planes and thereby suppress this mode. For effective suppression, the spacing of the pins in the lengthwise direction of the line should be no greater than a quarter wavelength.

If either of the transverse dimension, i.e., ground plane to ground plane or pin to pin spacing is greater than a half wavelength, a transverse electrical waveguide mode may be excited. Therefore, both these dimensions should be less than a half wavelength. There is also a restriction on the length of the circumferential path around the inner conductor 10 and passing midway between the inner conductor and the ground planes 12 and 14 and pins 16. This path should be less than a wavelength. Otherwise, the line will support a higher order transverse electric transmission line mode.

As pointed out above, a number of flat strip transmission lines may utilize the same ground planes with a different inner conductor for each line. In an arrangement of this type each of the inner conductors is in the electric and magnetic fields of the other conductors. Therefore, a portion of the energy introduced to each line is generally coupled to the other lines. In a typical case, the ratio of the power transferred to a line from another line parallel thereto decreases from −13 db to less than −45 db of the input power to the latter line as the spacing between the inner conductors is increased from 1/64 inch to 1/8 inch. Thus, a spacing of less than one inch may be maintained between the inner conductors of adjacent lines without causing appreciable cross-talk. From the opposite point of view, where coupling is desired, as in a variable coupler, a small amount of travel will suffice to cover the full range of coupling.

FIGS. 2 and 3 show in schematic form a variable coupler incorporating the principles of our invention. A main line generally indicated at 18 and a branch line generally indicated at 20 share a pair of ground planes 22 and 24 (FIG. 2). A pair of electrically conducting compensators 26 and 27, described below, are also disposed between the ground planes. As seen in FIG. 3, the line 18 comprises leads 28 and 29 extending from a coupling arm 30. The line 20 includes a pair of angled leads 32 and 34 extending from a coupling arm 36.

Coupling between the lines 18 and 20 depends on the proximity of the arm 36 to the arm 30. The magnetic and electric fields associated with the propagation of energy on one of the lines link the coupling arm in the other line and thereby transfer a portion of the energy to the latter line. More particularly, if energy is fed to the line 18 by way of the lead 29, as indicated by the arrow in FIG. 3, a portion will be coupled to the arm 36 from the arm 30. The coupled energy will travel in the reverse direction on the line 20, leaving the arm 36 by way of the lead 34 as shown by the arrow. That portion of the input energy not transferred to the line 20 is transmitted through the arm 30 to the lead 28.

The fields associated with the passage of energy along the arm 30 diminish with distance from the arm, and therefore the portion of the input energy transferred to the line 20 is an inverse function of the spacing between the arms 30 and 36. The closer the arm 36 is to the arm 30, the greater will be the degree of coupling. As pointed out above, the maximum ratio of coupled power to input power is at least −3 db, i.e., at least half the input power is transferred to the line 20 and half is transmitted through the lead 28. Maximum coupling occurs with the coupling arms 30 and 36 in closely spaced, overlapping relationship, i.e., the dotted line positions of FIG. 2.

From FIG. 2, it will be apparent that the presence of the arm 36 affects the capacitance of the line 18 along the arm 30. More specifically it increases the capacitance between the arm 30 and the ground planes 22 and 24. As the coupling ratio is increased, by moving the arm 36 toward the arm 30, this capacitance effect increases, reaching a maximum when coupling is at a maximum, as shown by the dotted line position of arm 36 in FIG. 2. The arm 30 also exerts a similar influence on the capacitance of the arm 36, increasing the capacitance between arm 36 and ground planes 22 and 24 as the coupling ratio is increased. Since the characteristic impedance of a transmission line depends in part upon the capacitance per unit length, the impedances of the arms 30 and 36 will, in the absence of compensation, vary with the degree of coupling, so that the characteristic impedances of the other portions of the lines 18 and 20 ordinarily match the impedances of the arms 30 and 36 at only one position of the coupler.

Compensators 26 and 27 overcome this problem by exerting opposite effects on the capacitances of the coupling arms as the spacing between the arms 30 and 36 is varied. By placing compensator 26 on the opposite side of arm 30 from arm 36, and connecting compensator 26 and arm 36 together, the movement of arm 30 with respect to compensator 26 is opposite to that of arm 36. Thus, when the arm 36 moves toward the arm 30 so as to increase the capacitance of the latter arm, the compensator 26 moves away from it, thereby tending to decrease the capacitance. The two effects substantially cancel out, so that the capacitance of the arm 30 is effectively maintained constant as the degree of coupling is varied from one extreme to the other.

The compensator 27, which is stationary during adjustment of the coupler, operates in the same manner on the capacitance of the arm 36. As the arm 36 moves between the arm 30 and the compensator 27, the contribution of one of the latter members to the capacitance of the arm 36 diminishes, while the contribution of the other increases. Therefore, the capacitance and characteristic impedance of the arm 36 are also maintained substantially constant.

It will be noted that, regardless of the degree of coupling to which the coupler is set, either the arm 36 or the compensator 26 or both will be in the electric field of the arm 30, thereby increasing its capacitance above the value which it would have in their absence. We have compensated for this effect by decreasing the width of the arm 30 in the coupling region, i.e., opposite of the arm 36. The width of the narrowed portion 30a is such as to provide a direct capacitance between this portion and the ground planes 22 and 24, which when added to the capacitance contributed by the compensator 26 and the arm 36, equals the capacitance per unit length of the other portions of the line 18. The characteristic impedance of the portion 30a will then be essentially equal to that of the rest of the line. For the same reason, the arm 36 is narrower than the leads 32 and 34, so that, with the contribution of the arm 30 and compensator 27 to its capacitance, its characteristic impedance is the same as that of these leads.

Still referring to FIG. 3, the length of the coupling region should be a quarter wavelength or an odd multiple thereof at the center frequency at which the coupler is to operate. These lengths provide maximum transfer of energy from one line to the other. The bandwidth of the coupler, which may be defined as the difference between the upper and lower frequencies at which the coupled power is 70 percent of the coupled power at the center frequency, decreases as the coupling ratio is decreased. However, even at minimum coupling, the bandwidth is approximately two octaves.

With the configuration of FIG. 3, the length of the coupling region is the length of the coupling arm 36, since essentially all of the coupling between the lines 18 and 20 is accomplished in this arm and the corresponding portion of the arm 30. Accordingly, the arm 30 may be made somewhat longer than the arm 36 to relieve the tolerance controlling the positions of the arms 30 and 36 perpendicular to the direction of their relative motion.

In FIG. 9, we have graphically illustrated the variations in coupling and directivity of our coupler as the coupling arm 36 of FIGS. 2 and 3 is traversed between its extreme positions. The curve A represents the ratio of input power of one line to power coupled therefrom to the other line. The curve B represents the ratio of input power to power transmitted through the input line. The origin corresponds to the dotted line positions of FIG. 2 where the coupling between the lines 18 and 20 is greatest. At this point, the ratios of input power to coupled and transmitted power are both 3 db. That is, half the input power in one line is transmitted through the same line and half is coupled to the other line. As the spacing between the arms 30 and 36 is increased, the ratio of input power to coupled power increases, i.e., the portion of input power coupled to the secondary line decreases. Correspondingly, the transmitted power increases, approaching the 0 db ratio, at which all the input power is transmitted and none is coupled.

Still referring to FIG. 9, it is seen that the curves A and B cover the entire range from 0 db on up. Therefore, input power to the coupler may be distributed between two loads in any desirable ratio. The load which is to receive the bulk of the power is connected to the line receiving the input power, and the other load is connected to the coupled or branch line. Suitable means may be provided to transpose the connections of the loads to the two lines to accomplish continuous variation throughout the range of the coupler.

Referring now to FIGS. 5 and 6, our coupler is contained in a housing generally indicated at 40 fitted with a cover generally indicated at 42. The cover 42 contains the stationary elements of the directional coupler, viz., the ground plane 22, the line 18 and the compensator 27. A movable plate generally indicated at 44 contains the movable elements of the coupler, viz., the ground plane 24, the line 20 and the compensator 26. The plate 44 is mounted for longitudinal motion in the housing 40 parallel to the cover 42, and its position is controlled by an adjusting mechanism generally indicated at 46.

The cover 42 and plate 44 are both metallic, and, as seen in FIG. 7, they engage each other along inner surfaces 48 and 50. The surfaces 48 and 50 are provided with depressions 52 and 54 filled with insulating material on which the lines 18 and 20 and compensators 26 and 27 are mounted. The line 18 and compensator 27 are disposed slightly above the surface 48, and the line 20 and compensator 26 are disposed slightly below the surface 50 so as to provide clearance between the fixed and movable elements in the various positions of the plate 44.

Direct connections to the leads 28 and 29 of line 18 are made by way of coaxial connectors 56 mounted on the cover 42 (FIGS. 4, 5, and 7). A pair of connectors 58 mounted on the cover 42 are used to make connections to the leads 32 and 34 of the line 20. Referring now to FIG. 7 it will be noted that raised conductors 60 are attached to the cover 42 by their direct connection to connectors 58. The raised conductors 60 are in sliding contact with leads 32 and 34. Thus, stationary connections to all four ports or terminal pairs of the coupler may be made at the top of the unit. In some applications, the sliding contact between the conductors and leads may be undesirable. In such cases, the connectors 58 may be attached to the underside of the plate 44 with access provided by suitable apertures in the bottom of the housing 40 as shown in FIG. 5.

Referring now to FIG. 6, the depression 54 in the plate 44 is shaped to follow closely around the line 20 and compensator 26, as well as the corresponding elements situated in the depression 52 of the cover 42. From FIG. 7, it will be seen that the inner surfaces 48a and 50a of the depressions 52 and 54 form the ground planes for the various elements of the variable conductor. The shape of the depression 54 and the corresponding shape for the depression 52 provide electrical conducting paths between the ground planes by means of the engaging surfaces 48 and 50 at points close to the various conductors of the coupler. These conducting paths thus function in the same manner as the pins 16 of FIG. 1 in suppressing undesirable modes of propagation in the coupler.

The movable plate 44 is positioned laterally within the housing 40 by a pair of spacers 64 and 66 forced against a side wall 68 (FIG. 6) by a pair of spring-loaded plungers 70 and 72 bearing against the opposite side wall 74.

As seen in FIGS. 5 and 8, the movable plate is kept in engagement with the cover 42 by a series of elastomeric tubes 76 cemented in grooves 78 and 80 in the underside of the plate 44. The radius of the tubes 76 is greater than the distance between the plate 44 and the bottom of the housing 40. The members are thus deformed, as shown in FIG. 5, and this provides sufficient upward force on the movable plate to maintain electrical contact between the surfaces 48 and 50 (FIG. 7). The tubes are also sufficiently resilient to deform in the direction of movement of the plate 44. The use of these tubes thus provides a simple and efficient means for maintaining contact between the plate and cover without creating undue frictional forces either at the engaging surfaces 48 and 50 or at other points during movement of the plate by the adjusting mechanism 46.

As best seen in FIG. 6, the adjusting mechanism 46 includes a lead screw 82 threaded through a travelling nut 84. The nut 84 carries a cam 86 engaging an inclined end surface 88 on the movable plate 44. As seen in FIG. 5, the cam, which may be of Teflon or nylon or other material having a relatively low coefficient of friction, is secured in a groove in the nut 84 by the vise-like action of screws 89. The plate 44 is biased against the cam 86 by a spring 90 extending between studs 92 and 94 fastened in the plate 44 and the bottom of the housing 40, respectively. Thus, rotation of the screw 82 and the accompanying traverse of the nut 84 and cam 86 cause the plate 44 to move to the left or right (FIGS. 5, 6 and 7), depending upon the direction of rotation. As pointed out above, such motion varies the spacing between the coupling arm 36 of the line 20 and the coupling arm 30 of the line 18 (FIGS. 2, 3 and 7).

Still referring to FIG. 6, the screw 82 is provided with a shank portion 82a extending through a bearing 96 in the side wall 74 of the housing 40. End thrust of the screw is supported by a disk 98 and underlying spring 100 contained in a cap 102 affixed to the wall 74 by screws 104. The other end of the screw 82 is provided with a shank portion 82b journaled in a bearing 106 in the side wall 68. The shank portion 82b has a shoulder 82c, and the force exerted by the spring 100 is taken up by a washer 108 engaging the shoulder 82c and contained within a cap 110. The cap 110 is affixed to the wall 68 by screws 112.

Referring to FIG. 4, the cam 86 is provided with a mark 116 opposite indicia 118 on the movable plate 44. The mark 116 and the indicia 118 are visible through an aperture 120 in the cover 42. The position of the mark 116 with respect to the indicia 118 uniquely determines the position of the movable plate 44 and, in turn, the coupling ratio of the directional coupler. Thus, the coupler may be pretested to any desired coupling ratio by bringing the mark 116 to its corresponding position opposite the indicia. It will be apparent that backlash in the screw 82 will have no effect on the accuracy of the indication provided by the mark 116. Therefore, fine screw tolerances and antibacklash arrangements are not required in the adjusting mechanism 46.

Thus, we have described an improved transmission line coupling device adapted to distribute input power between two outputs according to any desired predetermined ratio. Our invention is specifically directed to a variable parallel line directional coupler in which the spacing between the coupling arms is varied to adjust the relative values of the coupled and transmitted power. The coupler includes metallic compensators whose distances from the respective coupling arms are varied with the spacing between the arms. In this way, they compensate for changes in the capacitances of the arms resulting from the proximity of the arms to each other. Thus, the impedances presented by the coupler at all its terminal pairs remain essentially constant over the adjusting range.

Preferably, our variable directional coupler uses a flat-strip construction which facilitates relative movement of the main and branch lines, as well as the compensators. We have also described a compact unit incorporating the various elements of the coupler as well as a simple and efficient adjusting mechanism capable of setting the coupling ratio of the coupler to any preset value.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A variable transmission line coupler comprising, in combination, first and second transmission lines, each of said lines comprising a pair of conductors, said lines including first and second coupling sections in close proximity to each other, and adjusting means for varying the spacing between a first conductor in said first section and a second conductor in said second section, thereby to vary the mutual inductance of said first and second conductors, a compensator providing an electrical conducting path in close proximity to said first conductor and means for varying the spacing between said compensator and said first conductor in coordination with variations in spacing between said first and second conductors and in such manner that the spacing between said compensator and said first conductor decreases as the spacing between said first and second conductors increases.

2. The combination defined in claim 1 including supporting means supporting said compensator and second conductor on opposite sides of said first conductor, said adjusting means providing motion of said supporting means in a plane common to said first and second conductors.

3. A variable transmission line coupler comprising, in combination, first and second transmission lines, each of said lines comprising a pair of conductors, said lines including first and second coupling sections in close proximity to each other, adjusting means for varying the spacing between a first conductor in said first section and a second conductor in said second section, a first compensator providing an electrical conducting path in close proximity to said first conductor, first supporting means supporting said first compensator and said second conductor in fixed relationship to each other, a second compensator providing an electrical conducting path in close proximity to said second conductor, second supporting means supporting said first conductor and second compensator in fixed relationship to each other, said adjusting means being adapted to move said first supporting means relative to said second supporting means.

4. The combination defined in claim 3 in which said first and second conductors are parallel to each other.

5. The combination defined in claim 3 in which the length of said coupling sections is an odd multiple of a quarter wavelength at a frequency to be passed by said coupler.

6. The combination defined in claim 3 including a third conductor common to both of said transmission lines, said third conductor being the other conductor in each of said pairs thereof.

7. The combination defined in claim 3 in which said adjusting mechanism comprises a member in said first supporting means provided with a surface inclined to the direction of travel thereof, a screw inclined to said surface, camming means engaging said surface, said camming means being threaded on said screw and adapted to travel axially of said screw upon rotation thereof, a mark on said camming means and indicia on said member, whereby the position of said mark with respect to said indicia indicates the degree of coupling of said coupler.

8. A variable coupler comprising, in combination, first and second strip transmission lines, said lines comprising first and second inner conductors disposed between third and fourth ground plane conductors, a coupling section in which said first and second conductors are in close proximity to each other and adjusting means for effecting relative movement of said first and second conductors toward and away from each other in said coupling section, a first compensator providing a conducting path in close proximity to said first conductor, said adjusting means being adapted to move said compensator so as to decrease the spacing between said compensator and said first conductor when the spacing between said first and second conductors is increased and to increase the spacing between said compensator and first conductor when the spacing between said first and second conductors is decreased, thereby to maintain the characteristic impedance of said first conductor in said coupling section substantially constant over the adjusting range of said adjusting means.

9. The combination defined in claim 8 including a second electrically conducting compensator disposed between said third and fourth conductors and in close proximity to said second conductor, said adjusting means being adapted to vary the spacing between said second compensator and said second conductor in such manner that it increases when the spacing between said first and second conductors decreases and decreases when the spacing between said first and second conductors increases.

10. The combination defined in claim 8 in which the capacitances between said first and second conductors and said third and fourth conductors in the absence of said compensators are less than the capacitances of the remaining portions of said first and second transmission lines, whereby in the presence of said compensators and each other said lines have capacitances in said coupling section which are substantially equal to the capacitances of said remaining portions of said lines.

11. A variable transmission line coupler comprising, in combination, first and second ground plane conductors disposed in parallel spaced relationship, a first unit comprising said first ground plane conductor, a first inner conductor and an insulator supporting said first inner conductor between and parallel to said first and second ground plane conductors, a second unit comprising said second ground plane conductor, a second inner conductor and a second insulator supporting said second inner conductor between and parallel to said first and second ground plane conductors; a coupling region in which said inner conductors are in close proximity to each other, said units being adapted for relative movement parallel to said ground planes in such manner as to vary the spacing between said inner conductors in said coupling region, said first unit including a third inner conductor in close proximity to said second conductor and on the opposite side of said second conductor from said first conductor, said third inner conductor having a length substantially equal to that of said coupling region, said second unit including a fourth inner conductor in close proximity to said first conductor and on the opposite side of said first conductor from said second conductor, said fourth conductor having a length substantially equal to that of said coupling region, the spacing between said third conductor and said first inner conductor and the spacing between said fourth conductor and said second inner conductor being such as to maintain substantially constant characteristic impedances for said first and second inner conductors in said coupling region during said relative movement of said units.

12. The combination defined in claim 11 in which said first unit includes a third inner conductor in close proximity to said second conductor and on the opposite side of said second conductor from said first conductor, said third inner conductor having a length substantially equal to that of said coupling region, said second unit including a fourth inner conductor in close proximity to said first conductor and on the opposite side of said first conductor from said second conductor, said fourth conductor having a length substantially equal to that of said coupling region, the spacing between said third conductor and said first inner conductor and the spacing between said fourth conductor and said second inner conductor being such as to maintain substantially constant characteristic impedances for said first and second inner conductors in said coupling region during said relative movement of said units.

13. The combination defined in claim 11 in which the sizes of said first and second inner conductors are diminished within said coupling region, whereby the characteristic impedances of the transmission lines including said first and second inner conductors are substantially the same in said coupling region as along the remaining portions of said lines.

14. A variable transmission line coupler comprising, in combination, a fixed member and a movable member, a first surface on said fixed member, a first depression in said first surface, a first conductor, insulating means supporting said first conductor in said first depression near the plane of said first surface, a second surface on said movable plate, a second depression formed in said second surface, a second conductor, insulating means supporting said second conductor in said second depression near the plane of said second surface, means maintaining said surfaces in electrical contact with each other, said first and second conductors having coupling arms in close proximity to each other, said first and second surfaces and the opposite surfaces of said members being of electrical conducting material and in electrical conducting relationship with each other, and adjusting means for moving said movable member to vary the spacing between said coupling arms.

15. The combination defined in claim 14 in which the edge of each of said depression surrounds and closely follows the inner conductor therein and the projection of the other of said inner conductors therein, thereby to suppress undesirable modes of propagation within said coupler.

16. The combination defined in claim 15 including a first compensator supported by said first insulating means in said first depression on the opposite side of said second conductor from said first conductor and a second compensator supported by said second insulating means in said second depression on the opposite side of said first conductor from said second conductor, said compensators being electrical conductors coextensive with the common length of said coupling arms, whereby upon movement of said movable member by said adjusting means the characteristic impedances of said coupling arms remain substantially constant.

17. The combination defined in claim 14 in which said adjusting mechanism includes an edge of said movable member forming an obtuse angle with the direction of travel thereof, a lead screw angled to said edge, a cam unit threaded on said lead screw and in engagement with said edge and resilient means urging said edge against said cam unit, whereby rotation of said screw and the accompanying translatory motion of said cam unit vary the spacing between said coupling arms.

18. A variable coupler comprising, in combination, a housing, a stationary plate anchored to said housing, a movable plate enclosed in said housing, said plates carrying conductors in depressions formed in opposing surfaces thereof, said conductors having coupling portions whose spacing determines the coupling ratio between said conductors, said plates being formed of electrically conducting material, first resilient means acting between said movable plate and a wall of said housing to urge said opposing surfaces into contact with each other, means for guiding said movable plate for movement parallel to second and third walls adjoining said first wall, said movable plate having an end surface facing a fourth wall adjoining said first, second and third walls, said end surface forming an obtuse angle with the axis of travel of said movable plate, a lead screw journalled in said second and third walls, a cam unit threaded on said lead screw and engaging said end surface, a mark on said cam unit and indicia on said movable plate adjacent said end surface, second resilient means urging said surface against said cam unit, whereby rotation of said lead screw and accompanying translation of said cam unit therealong provides movement of said movable plate to vary the spacing between said coupling portions.

19. The combination defined in claim 18 in which said first resilient means comprises an elastomeric tubular member having a normally circular cross section whose radius exceeds the distance between said movable plate and said first wall.

References Cited in the file of this patent

UNITED STATES PATENTS

| | | |
|---|---|---|
| 2,531,777 | Marshall | Nov. 28, 1950 |
| 2,833,995 | Arditi | May 6, 1958 |
| 2,963,664 | Yeagley | Dec. 6, 1960 |